United States Patent [19]

Dominguez

[11] Patent Number: 4,585,850

[45] Date of Patent: Apr. 29, 1986

[54] FLAKEGLASS WITH SIZING, AMINO, CHLORO, ISOCYANATE AGENTS COATED DIRECTLY ONTO THE GLASS IN RRIM ELASTOMERS

[75] Inventor: Richard J. G. Dominguez, Austin, Tex.

[73] Assignee: Texaco Inc., White Plains, N.Y.

[21] Appl. No.: 645,721

[22] Filed: Aug. 30, 1984

[51] Int. Cl.[4] .................. C08G 18/38; C08G 18/50; B28B 1/24; C08K 3/40
[52] U.S. Cl. .................. 528/122; 528/48; 524/494; 264/328.1; 264/DIG. 83
[58] Field of Search .................. 528/48, 49; 521/110, 521/111, 122; 524/494

[56] References Cited

U.S. PATENT DOCUMENTS

| | | | |
|---|---|---|---|
| 3,309,261 | 3/1967 | Schiller et al. | 161/190 |
| 3,391,054 | 7/1968 | Lewis et al. | 161/186 |
| 3,523,918 | 8/1970 | Gonzalez | 521/110 |
| 3,838,076 | 9/1974 | Moss et al. | 521/167 |
| 3,847,992 | 11/1974 | Moss | 521/164 |
| 3,886,226 | 5/1975 | Asai et al. | 528/65 |
| 4,118,536 | 10/1978 | Beardsley et al. | 528/65 |
| 4,218,543 | 8/1980 | Weber et al. | 521/51 |
| 4,246,363 | 1/1981 | Turner et al. | 521/163 |
| 4,254,010 | 3/1981 | Mizuno et al. | 260/40 TN |
| 4,254,069 | 3/1981 | Dominguez et al. | 264/51 |
| 4,269,945 | 5/1981 | Vanderhider et al. | 521/163 |
| 4,272,618 | 6/1981 | Dominguez et al. | 521/160 |
| 4,288,563 | 9/1981 | Thorpe | 528/48 |
| 4,396,729 | 8/1983 | Dominguez et al. | 521/163 |
| 4,442,279 | 4/1984 | Fauss et al. | 528/44 |
| 4,444,910 | 4/1984 | Rice et al. | 521/51 |
| 4,456,718 | 6/1984 | Brinkmann et al. | 524/114 |
| 4,474,900 | 10/1984 | Dominguez | 521/110 |

OTHER PUBLICATIONS

Schwartz et al., Jour. Elastomers & Plastics, vol. 11, (Oct. 1979) pp. 280-299.
Galli, Plastics Compounding, (Jan.-Feb. 1982) pp. 21-28.

*Primary Examiner*—Herbert S. Cockeram
*Attorney, Agent, or Firm*—Jack H. Park; Kenneth R. Priem

[57] ABSTRACT

This invention relates to reaction injection molded elastomers derived from high molecular weight amine terminated polyethers and/or high molecular weight polyols, a chain extender, a polyisocyanate, and flaked glass treated with an amino, chloro, and/or isocyanate silane coupling agent. The reaction injection molded (RIM) elastomers of this invention are useful, for example, as automobile body parts.

13 Claims, No Drawings

FLAKEGLASS WITH SIZING, AMINO, CHLORO, ISOCYANATE AGENTS COATED DIRECTLY ONTO THE GLASS IN RRIM ELASTOMERS

This application is related to application Ser. No. 503,382 filed June 8, 1983, now allowed. Also related are the following applications filed of even date: Ser. No. 645,600, and Ser. No. 645,599.

BACKGROUND OF THE INVENTION

1. Field of the Invention

This invention concerns the field of reaction injection molded elastomers.

2. Description of the Prior Art

U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. Nos. 3,838,076 and 3,847,992 disclose foams made from amine terminated polyethers, wherein the amine termination ranges from 10 to 50 percent and 15 to 55 percent, respectively.

Quillery's U.S. Pat. No. 3,523,918 describes the use of amine chain extenders for the preparation of integral skin foams. Also, Weber's, et al. U.S. Pat. No. 4,218,543 describes the use of high molecular weight polyols, certain aromatic diamines and isocyanates for the production of RIM parts. This Bayer patent specifically claims as a chain extender 1-methyl-3,5-diethyl-2,4-diaminobenzene (diethyltoluene diamine) and its isomer.

Turner's U.S. Pat. No. 4,246,363 claims a RIM polyurethane composition derived from using at least three different polyols (including amine terminated polyethers) having specific relationships and reactivity and solubility parameters to one another. Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

Previously filed applications, Ser. No. 371,377 and U.S. Pat. Nos. 4,396,729; 4,444,910, and 4,433,067 relate to elastomers prepared using a high molecular weight amine terminated polyether, an aromatic diamine chain extender and a polyisocyanate which may be merely a polyisocyanate or a quasi-prepolymer prepared from a polyol reacted with a polyisocyanate wherein isocyanate groups are still left unreacted.

The paper "Silane Effects and Machine Processing in Reinforced High Modulus RIM Urethane Composites," by E. G. Schwartz, et al., *Journal of Elastomers and Plastics,* volume 11 (October 1979), page 280, describes the use of silane treated milled glass fibers in reinforced RIM composites.

The article "Surface Modification for RRIM Urethanes," by Ed Galli, *Plastics Compounding,* (January/February 1982) discloses silane treated glass fiber reinforcement of RRIM urethanes. The emphasis is on amino silanes.

Application Ser. No. 502,382 filed June 8, 1983, discloses and claims the use of epoxy modified filler material in RIM elastomers made from high molecular weight amine terminated polyethers and/or polyols.

In conventional RIM systems, the so-called A-component contains the isocyanate, whether it is pure isocyanate or a quasi-prepolymer, and a B-component which contains the active hydrogen containing materials, catalysts if needed, and most other additives, including reinforcing materials and fillers such as glass in various forms including, for example, fibers, flaked, or milled.

In my application Ser. No. 645,600 filed of even date, it is shown that amino silane added separately to a B-component containing a high molecular weight amine terminated polyether and flaked glass did not provide satisfactory results. However, I have found that using flaked glass which has been pretreated with amino silane in a similar system makes a RIM part with excellent properties.

It is known to use other types of glass pretreated with amino silane in polyurethane RIM applications. However, to the best of my knowledge, the industry has heretofore not found flaked glass pretreated with amino silane to be satisfactory in polyurethane RIM applications. I have discovered that using high molecular weight amine terminated polyethers to manufacture RIM elastomers allows the use of amino silane treated flaked glass with excellent results.

SUMMARY OF THE INVENTION

The invention is reaction injection molded (RIM) elastomer comprising a cured reaction product of polyols of greater than about 1,500 molecular weight and/or primary or secondary amine terminated polyethers of greater than 1,500 molecular weight, having greater than 50% of their active hydrogens in the form of amine hydrogens, a chain extender, flaked glass pretreated with amino silane coupling agent, and an aromatic polyisocyanate. The invention is also a method of preparation of a RIM elastomer as described above. Chloro and isocyanate silane pretreated flaked glass is also useful.

DESCRIPTION OF THE PREFERRED EMBODIMENTS

Amine terminated polyethers including primary and secondary amine terminated polyether polyols of greater than 1,500 average molecular weight having from 2 to 6 functionality, preferably from 2 to 3, and an amine equivalent weight from about 750 to about 4,000 are useful in this invention. Mixtures of amine terminated polyethers may be used. In a preferred embodiment the amine terminated polyethers have an average molecular weight of at least 2,500. These materials may be made by various methods known in the art.

The amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The aromatic diamine chain extenders useful in this invention include, for example, 1-methyl-3,5-diethyl-2,4 diaminobenzene, 1-methyl-3,5 diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

Other chain extenders which find use in the method of this invention are low molecular weight polyoxyalkylene polyamines which contain terminal amine groups and are represented by the formula

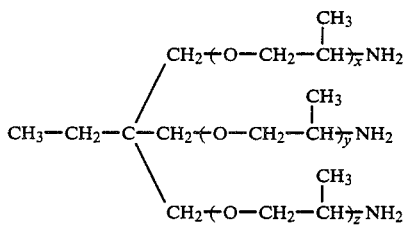

wherein $x+y+z$ has a value of about 5.3 The average amine hydrogen equivalent weight is about 67 and the product is commercially available from Texaco Chemical Company as JEFFAMINE® T-403. Another related polyoxypropylene polyamine is represented by the formula

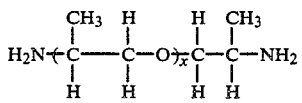

wherein x has a value of about 5.6. This product has an average amine hydrogen equivalent weight of about 100 and is commercially available from Texaco Chemical Company as JEFFAMINE D-400. The prooduct having the same formula as above wherein x has an average value of about 2.6 is also useful. This product has an average amine hydrogen equivalent weight of about 57.5 and is commercially available from Texaco Chemical Company as JEFFAMINE D-230.

Other chain extenders will be apparent to those skilled in the art and the above recitation is not intended to be a limitation on the invention claimed herein.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type can be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

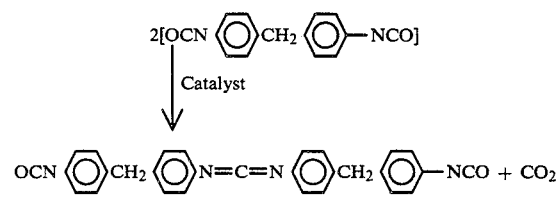

-continued

Carbodiimide

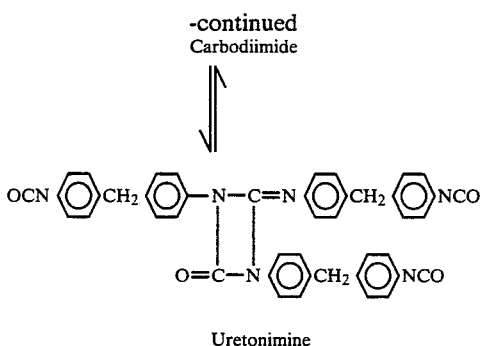

Uretonimine

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

If needed, the following catalysts are useful. Catalysts such as tertiary amines or an organic tin compound or other polyurethane catalysts are used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine), heterocyclic amines, such as N-alkylmorpholines (e.g., N-methylmorpholine, N-ethylmorpholine), dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Silane coupling agents useful in my invention are amino, chloro and isocyanate. Exemplary of these materials are monomers of the formula $R-SiX_3$, where R is the functional group and X are hydrolizable groups which are converted to silanol groups when hydrolized. A typical example is:

$$NH_2CH_2CH_2NH(CH_2)_3Si(OCH_3)_3$$

The amino silane is preferred.

Other similar materials known to those skilled in the art are included in the scope of this invention.

The reinforcing or filler material useful in the practice of my invention is flaked glass pretreated with amino silane. Chloro silane and isocyanate silane treated flaked glass are also useful.

Internal mold release agents are not recommended when the amino silane treated flaked glass is used.

Post curing of the elastomers of the invention is optional. Post curing will improve some properties such as heat sag. Employment of post curing, however, depends on the desired properties of the end product.

EXAMPLE 1

In this example, the following formulation was run in an Accuratio VR-100 machine and plaques of the composite RIM material were made:

| B-Component | |
|---|---|
| JEFFAMINE ® T-5000 | 62.33 pbw |
| Diethyltoluenediamine (DETDA) | 27.5 pbw |
| OCF 1/64" flakeglass that has been sized with an amino silane coupling agent | 43.15 pbw |
| A Component | |
| Upjohn Code 205 Isocyanate (a 2:1 by wt. quasi-prepolymer of Isonate ® 143L and Thanol ® SF-5505) | 82.78 pbw |

Plaques of this material had properties as are listed in Table 1. When exposed to 400° F. for one hour, test coupons of these plaques *did not* exhibit blistering. This is the first time that this performance has been observed in a RRIM product.

COMPARISON EXAMPLE A

In this example the same formulation as Example 1 was run in the Accuratio VR-100 RIM machine under the same conditions with the exception that in this formulation, unsized flakeglass was used. When exposed to 400° F. for one hour, test coupons of these plaques *did* exhibit gross surface blisters and distortion. This would make this material unacceptable in this application.

TABLE 1

| Material Properties | | Example 1[1] | Comparison Example A[1] |
|---|---|---|---|
| Tensile strength, psi | | 3,830 | 2,600 |
| Elongation, % | | 45 | 48 |
| Flexural modulus, psi | | | |
| Measured at | RT | 215,000 | 168,000 |
| | 158° F. | 153,000 | 123,000 |
| | −20° F. | 379,000 | 316,000 |
| | 311° F. | 127,000 | 124,000 |
| Heat sag, mm | | | |
| Measured at | 250° F. | 0.6 | 0.5 |
| | 311° F. | 4.5 | 5.8 |
| | 400° F. | 35.5 | 40.6 |

[1]Isocyanate index - 1.05; P/C one hour at 250° F. 20% by weight flakeglass 1/64"

Note also that the sized flakeglass-containing composite (Example 1) has much higher tensile strength and flexural modulus as compared to the unsized flakeglass-containing composite (Comparison Example A). Thus, the sized flakeglass-containing composite (Example 1) has good surface characteristics when exposed to 400° F. for one hour as well as better properties when compared to the unsized flakeglass-containing composite (Comparison Example A).

GLOSSARY OF TERMS AND MATERIALS

ISONATE® 143L—Carbodiimide modified liquid MDI; a product of the Upjohn Co.

JEFFAMINE® T-5000—polypropylene oxide triamine of about 5,000 molecular weight; a product of Texaco Chemical Co.

DETDA—Diethyltoluene diamine; a product of Ethyl Corp.

THANOL® SF-5505—A 5500 molecular weight polyether triol containing approximately 80% primary hydroxyl groups.

THANATE® L-55-0—Quasi-prepolymer—A quasi-prepolymer formed by reacting equal weight of ISONATE 143L and THANOL SF-5505; a product of Texaco Chemical Co.

I claim:

1. A reaction injection molded elastomer made by reacting in a closed mold amine terminated polyethers of greater than 1,500 average molecular weight having greater than 50% of their active hydrogen in the form of amine hydrogens, a chain extender, flaked glass pretreated with amino silane coupling agent, and an aromatic polyisocyanate.

2. An elastomer as in claim 1 wherein the amine terminated polyethers have a functionality ranging from about 2 to 3.

3. An elastomer as in claim 1 wherein the chain extender is diethyltoluene diamine.

4. An elastomer as in claim 1 wherein the polyisocyanate is a quasi-prepolymer.

5. A reaction injection molded elastomer made by reacting in a closed mold amine terminated polyethers of at least 5,000 molecular weight and having a functionality of from about 2 to 3 having greater than 50% of their active hydrogens in the form of amine hydrogens, a chain extender, flaked glass pretreated with amino silane coupling agent and a polyisocyanate.

6. A method for making a reaction injection molded elastomer comprising reacting in a closed mold amine terminated polyethers greater than 1,500 average molecular weight having greater than 50% of their active hydrogen in the form of amine hydrogens, a chain extender, flaked glass pretreated with an amino silane coupling agent, and an aromatic polyisocyanate.

7. A method as in claim 6 wherein the amine terminated polyethers have a functionality ranging from about 2 to 3.

8. A method as in claim 6 wherein the chain extender is diethyltoluene diamine.

9. A method as in claim 6 wherein the polyisocyanate is a quasi-prepolymer.

10. A method for making a reaction injection molded elastomer comprising reacting in a closed mold amine terminated polyethers of at least 5,000 molecular weight and having a functionality of from about 2 to 3 having greater than 50% of their active hydrogen in the form of amine hydrogens, an amine terminated chain extender, flaked glass pretreated with an amino silane coupling agent, and an aromatic polyisocyanate.

11. A method as in claim 10 wherein the chain extender is diethyltoluene diamine.

12. A method for making a reaction injection molded elastomer comprising reacting in a closed mold amine terminated polyethers of at least 5000 molecular weight and having a functionality of from about 2 to 3 having greater than 50% of their active hydrogen in the form of amine hydrogens, a chain extender, flaked glass pretreated with chloro silane coupling agent, and an aromatic polyisocyanate.

13. A reaction injection molded elastomer made by reacting in a closed mold amine terminated polyethers of greater than 1,500 average molecular weight having greater than 50% of their active hydrogen in the form of amine hydrogens, a chain extender, flaked glass pretreated with isocyanate silane coupling agent, and an aromatic polyisocyanate.

* * * * *